No. 730,305. Patented June 9, 1903.

UNITED STATES PATENT OFFICE.

CHARLES SHEPHERD, OF PROVIDENCE, RHODE ISLAND.

PROCESS OF TREATING WOOL-WASHING SUDS.

SPECIFICATION forming part of Letters Patent No. 730,305, dated June 9, 1903.

Application filed November 26, 1902. Serial No. 132,952. (No specimens.)

*To all whom it may concern:*

Be it known that I, CHARLES SHEPHERD, of Providence, in the county of Providence and State of Rhode Island, have invented certain new and useful Improvements in the Art of Treating Wool-Washing Water or Suds, of which the following is a specification.

This invention relates to the process of extracting from waste water or suds which has been used in washing wool in worsted and woolen factories wool-grease and other fats therein contained, the said grease constituting the product known as "degras," which is extensively used for filling leather used for the manufacture of boots and shoes and other purposes. Heretofore the said waste water or suds, which for the sake of brevity I will hereinafter refer to as "wool-suds," has been treated as follows: A considerable volume of the suds being accumulated in a pond or reservoir, it is allowed to stand for from four to six days to permit decomposition. A batch of the decomposed suds is then placed in a tank, where sulfuric acid is added to the suds for the purpose of separating its constituent parts, releasing the lighter grease from the heavier parts or ingredients, the said lighter grease rising to the surface, while the heavier ingredients are precipitated and accumulate at the bottom of the tank. The intermediate water is removed from the tank as an effluent and is discharged into a sewer or elsewhere. The grease and precipitated matter left in the tank are mixed by stirring or agitation and then allowed to pass from the tank in a semifluid condition onto a filter-bed, which is commonly composed of sand and gravel or cinders. The greater portion of the water remaining is removed from the residual matter by filtration, the effluent from the filter being also discharged as waste, while the residual matter, known as "magma," is inclosed in wrappers composed of burlap and placed in layers in a press and subjected to heat and pressure, the heat freeing the grease from the solid matter and the pressure expressing the grease, which is suitably collected and becomes the degras of commerce. The residuum is commonly used as a fertilizer.

The following very serious objections exist to the process above described, namely: First, the decomposition of the suds, which is necessary in order that the subsequent sulfuric-acid treatment may be effective, gives the suds a very offensive odor; secondly, the action of the sulfuric acid on the already bad-smelling suds intensifies the offensive odor, making the same well nigh unbearable, so that the effluent from the tank, as well as the effluent from the filter-bed, is extremely obnoxious in smell and detrimental to fish life in rivers and watercourses, its objectionable nature being such that in many places where the process has been carried on its practice has been prohibited by the boards of health; thirdly, both the degras and the residuum used as a fertilizer have a very objectionable and offensive odor.

My invention has for its object to obviate all the objections above mentioned and to enable wool-suds to be treated for the recovery of the degras in such manner that the effluent from the treatment-tank and from the filter will be practically odorless, colorless, and free from objection, and, further, so that the degras and the fertilizing residuum will also be free from objectionable odor.

To the above-mentioned ends my invention consists in the improvements which I will now proceed to describe and claim.

In carrying out my invention I add to the body of suds collected in the pond or reservoir and without allowing the suds to putrefy a deodorizing agent, which is preferably chlorid of lime, although other agents, such as salt and chlorin gas, may be employed. In practice I prefer to use about ten pounds of chlorid of lime to one thousand gallons of suds. The deodorizing agent performs its function in about one hour and may be applied to the suds while hot as they come from the washing establishment, no decomposition being required. I then place a batch of the deodorized suds in a tank and add thereto suitable agents or ingredients to facilitate the separation of the constituent parts—namely, the lighter grease, the relatively heavy solid matter, and the water. The agents which I prefer to employ for this purpose are as follows: chlorid of lime in the proportion of about ten pounds to one thousand gallons of suds, a solution of permanganate of potash produced by dissolving in water three or four ounces of crystals of this material, the solution thus formed being sufficient for one thousand gallons of suds, muriatic acid in the proportion of about twenty-five pounds to one thousand gallons of suds. These agents cause the separation of the lighter grease from the precipitates, the grease rising to the top, while the precipitates settle to the bottom, the latter containing a portion of the grease. The intermediate water is then removed and allowed to flow as an effluent, which is practically colorless and odorless and has no injurious effect on fish or other life, and consequently its admission into a watercourse is not objectionable. The chlorid of lime employed at this stage of the treatment acts as a deodorizing agent and also as a precipitant and, further, quickens the susequent filtration. The permanganate of potash acts, in conjunction with the chlorid of lime, as a separator or precipitant and also acts to bleach and disinfect the grease. These two ingredients alone, however, tend to convert the grease into a lime-soap. This tendency is neutralized by the muriatic acid, the result being a maximum yield of grease having the qualities desired in degras. The residuum in the tank is then removed to a filter-bed, which may be composed of gravel and sand or cocoa matting or may be otherwise constructed. The bulk of the remaining water is separated by filtration from the residual matter, which constitutes the magma. The effluent from the filter, like that from the tank, is colorless, odorless, and inoffensive. The magma is now collected and placed in layers, each wrapped in burlap, in a steam-heated press, where heat and pressure are applied to separate the grease from the fertilizing residuum. The grease is suitably collected and constitutes degras, which, as well as the fertilizer, is free from objectionable odor.

I find that the degras produced by my improved process is more effective than that produced as heretofore, because it contains a larger proportion of saponifiable fat.

I claim—

1. That improvement in the art of treating wool-suds which consists in adding a deodorizing agent to the suds, and subsequently treating the deodorized suds with permanganate of potash to facilitate separation of its ingredients quicken the subsequent filtration and cause a maximum yield of purified grease.

2. That improvement in the art of treating wool-suds which consists in adding a deodorizing agent to the suds without permitting decomposition of the suds, and subsequently treating the deodorized suds with chlorid of lime and permanganate of potash to facilitate separation of its ingredients and further purify and deodorize the same.

3. That improvement in the art of treating wool-suds which consists in adding a deodorizing agent to the suds without permitting decomposition or putrefaction of the suds, and then treating the suds with chlorid of lime, permanganate of potash, and muriatic acid.

In testimony whereof I have affixed my signature in presence of two witnesses.

CHARLES SHEPHERD.

Witnesses:
EDWARD H. MEYER,
EMIL P. MEYER.